(12) United States Patent
Jud

(10) Patent No.: US 6,440,530 B1
(45) Date of Patent: Aug. 27, 2002

(54) LIDS FOR CLOSING OFF CONTAINERS

(75) Inventor: Wilfried Jud, Singen (DE)

(73) Assignee: Alcan Technology & Management Ltd., Neuhausen am Rheinfall (CH)

( * ) Notice: Subject to any disclaimer, the term of this patent is extended or adjusted under 35 U.S.C. 154(b) by 0 days.

(21) Appl. No.: 09/461,313

(22) Filed: Dec. 15, 1999

(30) Foreign Application Priority Data

Dec. 16, 1998 (EP) ............................................. 98811233

(51) Int. Cl.$^7$ ................................................. B32B 3/10
(52) U.S. Cl. ........................ 428/141; 428/147; 428/142; 428/195; 428/200; 428/343; 428/353; 428/347; 428/148; 428/219; 428/213
(58) Field of Search ................................. 428/141, 147, 428/142, 195, 200, 343, 353, 347, 148, 219, 213

(56) References Cited

U.S. PATENT DOCUMENTS

| | | | |
|---|---|---|---|
| 4,734,335 A | 3/1988 | Monzer | |
| 5,392,986 A | 2/1995 | Beer et al. | |
| 6,127,023 A | * 10/2000 | Marbler et al. | ............. 428/200 |
| 6,200,663 B1 | * 3/2001 | Zuser et al. | ................. 428/156 |

FOREIGN PATENT DOCUMENTS

| | | |
|---|---|---|
| DE | 2717866 | 10/1989 |
| EP | 0115033 | 12/1983 |
| EP | 0514803 | 5/1992 |
| EP | 0798108 | 3/1997 |

OTHER PUBLICATIONS

Translation of GE 0 798 108, Franz Reiterer, Oct. 1, 1997, 10 pages.*

* cited by examiner

*Primary Examiner*—Blaine Copenheaver
*Assistant Examiner*—Hai Vo
(74) *Attorney, Agent, or Firm*—FIsher Christen & Sabol

(57) ABSTRACT

Lids, for example, lids for machine-lidding of, e.g., beakers, dishes, menu dishes, goblets, small packages, etc., containing a substrate material featuring, with respect to a container on which the lids are used, a smooth outward facing surface bearing printing. On the inward facing side of the lid is a sealing layer deposited by extrusion laminate coating. The sealing layer exhibits on the free surface embossing with a depth of roughness of up to 50 μm. The embossing is transferred to the sealing layer in the form of a roughness pattern on the cooling roll on depositing the laminate coating of the substrate material and extruded sealing layer. The free side of the substrate material is smooth and exhibits no embossing. Printing on the free surface is therefore of higher quality. The extruded sealing layer on the substrate material exhibits embossing on the free side. If the lids are drawn from a stack of lids, for example, in a filing machine, the embossing allows them to be separated individually. The lids are suitable for closing off containers using a sealing seam in which the lids contain a substrate material featuring, with respect to a container on which the lids are used, outward facing printing and an inward facing sealing layer.

16 Claims, No Drawings

LIDS FOR CLOSING OFF CONTAINERS

This application has priority benefit of European Patent Application No. 98811233.0, filed on Dec. 16, 1998.

The present invention relates to lids for closing off containers using a sealing seam in which the lids contain a substrate material featuring, with respect to a container on which the lids are used, outward facing printing and an inward facing sealing layer.

It is known to provide containers such as deep drawn or stretch drawn containers with a ring-shaped shoulder at their opening and to lid such containers, in particular after filling, such that the lid lies over the whole of the shoulder and e.g. by sealing or adhesive bonding, to attach the lid permanently and in an air-tight manner to the shoulder.

The lids are e.g. stamped out of an endless strip of lid material and stacked. The stacks of lids are fed to a packaging machine and the individual or unstacked lids continuously sealed on to the already filled containers. The lids—already featuring a sealing layer—are sealed onto the shoulder region of the container at the edge of the container using a sealing tool. The separation or unstacking of the lids from the stacks is not always reliably performed by the packaging machine as the stacked lids may stick to each other. It is possible to prevent the lids from sticking together, for example by embossing the lid material. Embossed patterns on the lid material, however, have a negative effect on the printed image on the outside of the lid.

The lid material can be of various different materials depending on the requirements in question. Typical examples of lid material are metal foils which may be coated with plastic on one or both sides. Other lid materials contain or comprise of plastics in the form of mono-films or multilayer laminates. Further lid materials can be of cellulose-containing materials such as cellophane or paper. Also laminates of metal foil and plastic films are employed. In order to seal the lid material to the edge of the container, the lid material is provided over the whole of its surface with a sealing layer such as an organic coating or sealing film, whereby the sealing layer is deposited at least on the side of the finished packaging facing the inside i.e. facing the interior of the container.

The lid material also serves as a substrate for information and advertising. For that reason the lid material is generally provided with printing on its outside. The printing may be on the uppermost layer facing outwards on the finished container i.e. so called first form printing. The printing may also be covered over by a protective lacquer or a protective film, or the uppermost layer may be of transparent material and bear the printing as a reverse image in the form of counter-printing. The printed images may be single or multi-coloured and may be deposited in a printing machine.

Application of an embossed image is a disadvantage with known lid materials. The embossing is necessary in order that the lids manufactured from the lid material in stacks can be fed to the packaging machine, and that the lids can even be separated piece for piece from the stack and sealed onto the container. As the lid material has to be embossed, the finished lid is at a disadvantage to reproduce the desired image.

The object of the present invention is to overcome this disadvantage and to propose a lid that can be separated into individual lids from a stack of lids, yet reproduces with high quality the image on its surface.

That objective is achieved by way of the invention in that the sealing layer on the free surface exhibits embossing with a depth of roughness of up to 50 $\mu$m and the free surface of the substrate material showing the printing is smooth and is not embossed.

The depth of roughness is e.g. from 3 to 30 $\mu$m, usefully 3 to 20 $\mu$m and advantageously 5 to 10 $\mu$m. The depth of roughness is in particular not greater than the thickness of the sealing layer.

The sealing layer may be an extrusion layer or a co-extrusion layer.

The sealing layer may contain a co-extrusion layer of a bonding agent and/or a primer and a seal-able thermoplastic. The bonding agent and/or primer lie on the substrate material and the sealable thermoplastic on the bonding agent and/or primer.

The sealing layer exhibits e.g. a weight per unit area of 30 g/m$^2$ and less, usefully from 2 g/m$^2$ to 20 g/m$^2$, advantageously from 2 g/m$^2$ to 15 g/m$^2$, in particular from 5 g/m$^2$ to 10 g/m$^2$.

The sealing layer may be e.g. a co-extrudate with a bonding agent as extrusion layer having a weight per unit area of 2 to 10 g/m$^2$, usefully from 2 g/m$^2$ to 8 g/m$^2$, and an extrusion layer of a thermoplastic having a weight per unit area of 3 to 25 g/m$^2$, in particular from 5 g/m to 10 g/m$^2$.

The substrate material may be a monofilm of plastic or a multilayer composite made up of two or more plastic layers or a metal foil or a multilayer composite of at least one metal foil and at least one plastic film. The substrate material may also be comprised of a cellulose-containing material or contain a cellulose-containing material. The cellulose-containing material may be coated on one or both sides with a plastic layer or be metallized or may exhibit on one side a plastic layer and a metallized layer on the other side. The plastics of the substrate material may be e.g. polyolefins such as polyethylenes or polypropylenes, polyamides, polyethylene-terephthalates or polyvinylchlorides. Steel or aluminium e.g. may be used as metal foils. Cellulose-containing materials that may be used are e.g. papers or semi-cardboard. Further substrate materials are e.g. cellophane. The substrate material may have a thickness e.g. of 12 to 500 $\mu$m, whereby the substrate materials in the form of plastic films or metal foils or metal foils and plastic films are preferably 12 to 150 $\mu$m thick, while lid materials containing cellulose-containing materials are e.g. 40 to 500 $\mu$m thick. The substrate materials are in particular flexible to such an extent that they can be coiled into rolls.

The substrate material may also exhibit a barrier layer against gases, vapors and moisture. Barrier layers may be—in addition to the above mentioned metal foils—be e.g. of plastics such as polyvinylidene-chloride or ethyl-vinyl-alcohol, or may be a layer of ceramic material such as the oxides or nitrides of silicon or aluminium, deposited in a vacuum deposition process onto a substrate film as a thin layer e.g. in the thickness range of 10 to 500 nanometers. Examples of further barrier layers are metal layers e.g. of aluminium deposited on the substrate by sputtering.

Printing may be provided on the side of the lid which on the finished container is the outward facing side. Such printing may be advertising, competition or information in word form and/or image form. The printing of the substrate material may be performed using all known printing methods such as e.g. typographic, offset, flexo, screen, heliographic and copper-plate printing. The choice as to which printing method is to be used depends on the quality of printing desired, on the prevailing technical aspects and the size of series to be printed. Preferred is flexo-printing (also known as aniline or rubber printing) and intaglio printing such as copper-plate, or helio printing. The printing on the outside of the substrate may be protected additionally e.g. by coating over with a protective lacquer or, using a laminating agent or an adhesive, a transparent film—e.g. of polyethylene-terephthalate, polyamide, polyolefins such as polyethylene or polypropylene or a cellophane layer which, however, in general in order to protect the printed image is printed on by counter-printing—may be laminated onto the substrate material. The printing may take place on the substrate material or after depositing the sealing layer.

The non-printed material—as with the printed substrate material—is in particular smooth and non-embossed or exhibits a smooth surface without embossing. As a result the printing quality is unimpaired.

The sealing layer may contain or comprise a thermoplastic, for example from the series of polyolefins, preferably polyethylenes or polypropylenes or copolymers or terpolymers of ethylene e.g. copolymers or terpolymers of ethylene and acrylic acid (EAA, ethyl acrylic acid), of ethylene and acrylic esters such as methacrylate (EMA), ethyl acrylate (EAA) or butylacrylate (EnBA), of ethylene and vinylacetates (EVA), of ethylene and methacrylic acid (EMMA), of ethylene and ethylacrylate and acrylic acid (EAEAA) or ionomer resins, alone or in mixture form. The sealing layer may also contain one of the aforementioned thermo-plastics and bonding agent or primer, for example from the polyester or vinylpolymer series. The sealing layers may contain or be made of e.g. polyesters or polyamides or their copolymers or terpolymers.

The present invention relates also to a process for manufacturing lids for closing off containers by means of a sealing seam, where the lid with reference to a container on which the lid is employed, contains a substrate material with outward facing printing and an inward facing sealing layer.

The process may be performed in such a manner that the substrate material is coated, via extrusion coating or co-extrusion coating, with an extrusion layer (extrusion film) or co-extrusion layer (co-extrusion film) forming the sealing layer, and the coated substrate material is passed between a pressure roll and a cooling roll while being put under pressure, whereby the substrate material faces the pressure roll and the extrusion layer or co-extrusion layer faces the cooling roll, and the configuration of the surface of the cooling roll transfers to the extrusion layer or co-extrusion layer i.e. the sealing layer as a reverse image. For example the substrate material is uncoiled from a roll as an endless strip and passed over a pressure roll. The film or films of the sealing layer are produced in one or more extruder nozzles in the region of the pressure roll. In order to improve mutual adhesion, the substrate material and/or the extrusion layer or layers may be subjected to flame, plasma, corona or ozone treatment. Under the action of gravity the extruded film or films make contact with the substrate material running continuously over the pressure roll. The contact surface of the pressure roll is essentially smooth i.e. in particular not embossed and without any roughness structure. The cooling roll is provided in the device as counter roll to the pressure roll. The surface of the cooling roll is embossed. The substrate material coated with the extruded film or films passes between the pressure roll and the embossed cooling roll. The surface of the pressure roll is smooth or without embossing or the like and supports the substrate material, the free surface of which also remains smooth while the cooling roll transfers its image onto the solidifying extrusion film i.e. the sealing layer. The result is a lid material one side of which, the substrate material and printed side, is smooth and non-embossed while the other side viz., the sealing layer side, exhibits a roughness pattern or embossing. In other words the lid material or the lid according to the invention therefrom exhibits one on top of the other as the case may be, a protective lacquer or a protective film, printing and/or counter-printing, the actual substrate material and finally the sealing layer comprising a layer of thermoplastic or a layer of bonding agent and/or primer and a layer of thermoplastic, where the free surface of the layer of thermoplastic exhibits the roughness pattern. Used as a lid, the sealing layer in particular faces the interior of the container and the printing faces out. By employing stamping or cutting methods, the individual lids can be made from the lid material which can be coiled into roll form. The lids may then be stacked for e.g. use in a filling machine.

The cooling roll preferably exhibits as surface configuration a surface roughness pattern having a roughness depth of up to 50 μm, usefully from 3 to 30 μm, advantageously from 3 to 20 μm and in particular from 5 to 10 μm.

The roughness pattern on the cooling roll may e.g. be created by grinding, spark erosion, embossing, blasting with hard materials etc. The roughness pattern should to advantage not exceed a depth of roughness which is greater than the thickness of the sealing layer. This means that the roughness pattern should not penetrate the sealing layer and the embossing should also not be transferred to the substrate material. The roughness pattern on the cooling roll may take any form and may be a random pattern of recesses in the surface, it may be a worm-shaped embossing, damask-like embossing, line-shaped, stroke or dot-like pattern etc.

The lids according to the invention of a substrate material with—referring to containers on which the lids are used—outward facing printing and inward facing sealing layer, find application in the closure of containers that have a shoulder region, the lids being attached via the sealing layer to the container in the shoulder region. Such containers are e.g. deep drawn or stretch drawn or cast, such as injection moulded, containers, or otherwise shaped containers the opening in which feature a flat ring-shaped shoulder. The containers are lidded, in particular after filling, and viz., such that the lid lies over the whole of the shoulder and is attached to the shoulder in an air-tight manner e.g. by sealing or adhesive bonding. Such beakers, dishes, menu-dishes e.g. such with a plurality of compartments, goblets, small forms of packaging etc. may be employed for packaging foodstuffs of all kinds such as e.g. milk products, in particular yoghurt, cream for whipping, sour milk, sour cream, coffee cream, ready made meals of salads or semi-conserved or fully conserved foodstuffs, pre-cooked or otherwise prepared meals, drinks such as fruit juices and vegetable juices, drinking water etc.

The lids in question may be sealed to the rim of the container by means of the sealing layer. The strength of the seal can be adjusted by appropriate choice of sealing tool, the sealing pressure and the sealing temperature. Aids to tearing may be provided e.g. in the form of weaker sealed regions at the seam, or by means of zigzag shaped edges to the sealing seams. Instead of sealing via the sealing layer, the bonding may be effected using an adhesive such as a contact adhesive or an adhesive that bonds under the action of heat and/or pressure.

The lid material presented here has the advantage that e.g. in order to create the sealing layer in the form of an extrusion layer or co-extruded layer, it is not necessary to employ solvents that have to be vaporised and recovered or destroyed. The embossing at the sealing seam prevents the lids from sticking together on being separated from the stack. As a result, the stacked lids according to the invention having one smooth side and one embossed side may be used reliably in packaging machines.

The finished lids may also feature a tear-off or gripping flap and/or weakness, e.g. in the form of perforations or tearing notches which make it easier to open the container on removing the lid.

What is claimed is:

1. A lid for closing off a container that has a sealing seam, said lid contains a substrate material having with respect to the container on which the lid is used, an outward facing surface with printing thereon and having an inward facing surface with a sealing layer thereon, the sealing layer being an extrusion or coextrusion layer which has been extruded or coextruded, respectively, onto the inward facing surface of the substrate material and has then been subjected to pressure from a cooling roller having a contact surface with a roughness pattern, the sealing layer extends completely over said inward facing surface of the substrate material, the surface of the sealing layer away from the substrate material has embossing with a depth of roughness of up to 50 $\mu$m, the surface of the sealing layer toward the inward facing surface of the substrate material is smooth and not embossed, and the outward facing surface of the substrate material with the printing thereon is smooth and is not embossed, the sealing layer is outer layer on the inward facing surface of the substrate material.

2. The lid according to claim 1 wherein the depth of roughness is 3 to 30 $\mu$m.

3. The lid according to claim 1 wherein the depth of roughness is 3 to 20 $\mu$m.

4. The lid according to claim 1 wherein the depth of roughness is 5 to 10 $\mu$m.

5. The lid according to claim 1 wherein the substrate material comprises at least one member selected from the group consisting of at least one nonembossed thermoplastic, nonembossed cellophane, nonembossed cellulose-containing material, nonembossed metal foil, and combinations thereof.

6. The lid according to claim 5 wherein the substrate material comprises a combination of at least one thermoplastic and/or a cellophane and/or a cellulose-containing material and/or a metal foil, in the form of a multilayer, nonembossed composite material.

7. The lid according to claim 6 wherein the substrate material contains a barrier layer against gases, vapors and moisture in the form of a ceramic layer or a metallized layer or a plastic film or a metal foil.

8. The lid according to claim 6 wherein the sealing layer has a weight per unit area of 30 g/m$^2$ and less.

9. The lid according to claim 6 wherein the sealing layer has a weight per unit area of from 2 to 20 g/m$^2$.

10. The lid according to claim 6 wherein the sealing layer has a weight per unit area of from 2 to 15 g/m$^2$.

11. The lid according to claim 6 wherein the sealing lid has a weight per unit area of from 5 to 10 g/m$^2$.

12. A lid for closing off a container that has a sealing seam, said lid contains a substrate material having with respect to the container on which the lid is used, an outward facing surface with printing thereon and an inward facing sealing layer, the sealing layer is a member selected from the group consisting of (a) an extrusion layer, (b) a coextrusion layer and (c) a coextrusion layer that contains (i) a bonding agent and/or a primer and (ii) a sealable thermoplastic, and that has been extruded or coextruded, onto the substrate material on the other surface of the substrate material and has then been subjected to pressure from a cooling roller having a contact surface with a roughness pattern, the sealing layer extending completely over said other surface of the substrate, the sealing layer on the free surface having embossing with a depth of roughness of up to 50 $\mu$m, and the surface of the substrate material with the printing thereon is smooth and is not embossed.

13. The lid according to claim 12, wherein the sealing layer comprises at least one thermoplastic from the group consisting of polyolefin, polyester, polystyrene, polyamide, their copolymers, their terpolymers, and combinations thereof.

14. The lid according to claim 13, wherein the sealing layer comprises polyethylene, or polypropylene, or copolymer or terpolymer of ethylene.

15. A lid for closing off a container that has a sealing seam, said lid contains a substrate material having with respect to the container on which the lid is used, an outward facing surface with printing thereon and an inward facing sealing layer, the substrate material comprises a combination of at least one thermoplastic and/or a cellophane and/or a cellulose-containing material and/or a metal foil, in the form of a multilayer, nonembossed composite material, the sealing layer has a weight per unit area of 30 g/m$^2$ and less, the sealing layer is a coextrudate containing a bonding agent in the form of an extrusion layer having a weight per unit area of from 2 to 10 g/m$^2$, and an extrusion layer of thermoplastic having a weight per unit are from 3 to 25 g/m$^2$, the sealing layer has been coextruded onto the substrate material on the other surface of the substrate material and has then been subjected to pressure from a cooling roller having a contact surface with a roughness pattern, the sealing layer extending completely over said other surface of the substrate, the sealing layer on the free surface having embossing with a depth of roughness of up to 50 $\mu$m, and the surface of the substrate material with the printing thereon is smooth and is not embossed.

16. A lid for closing off a container that has a sealing seam, said lid contains a substrate material having with respect to the container on which the lid is used, an outward facing surface with printing thereon and an inward facing sealing layer, the substrate material comprises a combination of at least one thermoplastic and/or a cellophane and/or a cellulose-containing material and/or a metal foil, in the form of a multilayer, nonembossed composite material, the sealing lid has a weight per unit area of from 5 to 10 g/m$^2$, the sealing layer is a coextrude containing a bonding agent in the form of an extrusion layer having a weight per unit area of from 2 to 8 g/m$^2$ and an extrusion layer of thermoplastic having a weight per unit area of from 5 to 10 g/m$^2$, the sealing layer has been coextruded onto the substrate material on the other surface of the substrate material and has then been subjected to pressure from a cooling roller having a contact surface with a roughness pattern, the sealing layer extending completely over said other surface of the substrate, the sealing layer on the free surface having embossing with a depth of roughness of up to 50 $\mu$m and the surface of the substrate material with the printing thereon is smooth and is not embossed.

* * * * *